United States Patent [19]

Jaspon

[11] Patent Number: 4,588,758

[45] Date of Patent: May 13, 1986

[54] TIRE SEALANT COMPOSITION

[76] Inventor: Lawrence E. Jaspon, 643 Barbour Island, Clearwater, Fla. 33515

[21] Appl. No.: 711,520

[22] Filed: Mar. 13, 1985

[51] Int. Cl.$^4$ .......................... C08K 3/10; C08K 5/01; C08K 7/12; C08L 33/02

[52] U.S. Cl. .................................. 523/166; 523/351; 524/306; 524/389; 524/390; 524/424; 524/452; 524/560

[58] Field of Search ................ 523/166, 351; 524/306, 524/452, 560, 389, 390, 424

[56] References Cited

U.S. PATENT DOCUMENTS 4,337,322  6/1982  Jaspon .................................. 523/166

*Primary Examiner*—Allan M. Lieberman
*Attorney, Agent, or Firm*—Frijouf, Rust & Pyle

[57] ABSTRACT

A tire sealant composition for injection into pneumatic tires is provided. The tire sealant composition promotes heat transfer in a rolling tire, thereby keeping the tire somewhat cooler; it assists in balancing the wheel and tire, thereby prolonging the life of the tire and precluding unnecessary unevenness of wear of the tire; and the tire sealant composition serves to seal the tire around the wheel rim and particularly in the tread area of the tire against punctures. The composition includes a thickener and binding agent, asbestos fibers, ethylene glycol, hydrocarbon process oil, a detergent as a wetting agent and emulsifier, sodium bicarbonate, and water.

10 Claims, No Drawings

TIRE SEALANT COMPOSITION

FIELD OF THE INVENTION

This invention relates to tire sealant compositions and processes for making the same. In particular, the invention relates to a tire sealant composition which may be injected into pneumatic tires, for purposes of providing an anti-puncture sealant in the tread area of the tire, and as well to provide a tire coolant agent and a tire balancing agent.

BACKGROUND OF THE INVENTION

The present inventor is the inventor in U.S. Pat. No. 4,337,322, issued June 29, 1982. In that patent, there is disclosed a tire filling composition which includes asbestos fiber, ethylene glycol monomer, polyethylene glycol, polyisoprene, process oil (normally a vegetable oil), detergent, sodium bicarbonate, and water. Continuing tests of tire filling and sealing compositions have revealed, however, that certain modifications to the original formulation provide a more effective sealant, and provide better balancing (especially for automobile tires) and better heat transfer characteristics so as to keep tires operating at a lower temperature after they have been driven for a while. Indeed, the composition of the previous patent has been extensively modified, to the effect that polyethylene glycol is no longer used, nor is polyisoprene; a hydrocarbon process oil is now included in the composition; an industrial grade detergent as a wetting agent and emulsifier is now used; and a thickener and binding agent is added.

Accordingly, the present invention provides a composition which includes ethylene glycol, a thickener and binding agent, asbestos fiber, hydrocarbon process oil, an industrial grade detergent as a wetting agent and emulsifier, sodium bicarbonate, and water.

An improved process for manufacturing the tire sealant composition is provided by the present invention, whereby the pH, specific gravity, and viscosity of the finished product—which is batch mixed—may be closely controlled and adjusted as necessary and so as to meet certain specific requirements for use of the tire sealant composition in various types of circumstances.

For example, it is desired that the tire sealant composition of the present invention always have a specific gravity of from about 1.1 to about 1.4, that it have a pH in the range of 8.0 to 9.0; and that the viscosity may be such that it can be easily measured using a funnel as a viscosity measuring tool (as described hereafter) where the viscosity may be consistent from batch to batch or may be varied by the addition of more or less of certain of the constituents. For example, when the product is to be injected into truck tires or off-road tires for such as earth moving equipment, it may have a higher viscosity than when it is intended for injection into automobile tires.

It has been found that suppliers of asbestos fiber will provide what is known as "wet pack" industrial grade asbestos, which may be easily and safely handled; but the present invention also contemplates that the asbestos fibers may be pre-wetted by admixing them with water in small quantities so as to make the fibers easily handled. Wet pack or wet mixed asbestos fiber, however, may appear to be substantially dry to the touch.

The purposes, safety aspects, and advantages of the use of tire sealant compositions are discussed at some length in the inventor's previous United States patent noted above. However, the following discussion will provide observations of tests made by an independent testing authority of compositions according to the present invention, which clearly demonstrate the superiority of the present composition and its better fulfillment of the purposes that have previously been set forth.

DESCRIPTION OF PREFERRED EMBODIMENTS

As stated above, the present invention provides a tire sealant composition which is intended for injection into pneumatic tires, and which comprises a thickener and binding agent, asbestos fibers, ethylene glycol, hydrocarbon process oil, detergent as a wetting agent and emulsifier, sodium bicarbonate, and water.

In the usual case, the thickener and binding agent that is used is sodium polyacrylate; and that product may be available in the market under the product name or trade mark AQUASOL, ASE 95.

The asbestos fibers which are used in keeping with the present invention may be purchased as Grade 4T, wet pack; and those fibers generally have a fiber length of 0.5 to 1.5 cm.

The hydrocarbon oil that is used may be a standard grade motor oil, which is a process oil having an SAE standard grading of 5W40 to 10W30, usually 10W30 or 10W40.

The detergent that is used as a wetting agent and emulsifier is an industrial grade detergent, usually sodium dioctyl sulfosuccinate; and that product may be available in the market under the product name or trademark AEROSOL OT-75.

The sodium bicarbonate that is used may be an industrial grade sodium bicarbonate; similarly, the ethylene glycol that is used may be an industrial grade ethylene glycol.

When the composition of the present invention is mixed together in a batch processing operation, the constituents may be added together in the approximate amounts given below, for a batch quantity of 4.25 gallons (Imperial measure) of the final product that has been mixed. The mixing is in a continuous mixing drum or vat, as discussed hereafter, where the constituents are present in the following quantities (plus or minus 10% for each constitutent):

1 oz. (by weight) of thickener and binding agent,
37 oz. (by weight) of asbestos fibers,
300 oz. (by weight) of ethylene glycol,
8 oz. (by weight) of hydrocarbon process oil,
5 oz. (by weight) of detergent,
27 oz. (by weight) of sodium bicarbonate,
together with sufficient water to yield 4.25 gallons (Imperial measure) of final products.

In general, the tire sealant composition of the present invention has a pH in the range of 8.0 to 9.0, which may be adjusted in a manner described hereafter; and the composition generally has a specific gravity in the range of 1.1 to 1.4.

At a certain stage during the process of manufacturing the tire sealant composition of the present invention, the pH of the batch which is being prepared is tested and adjusted to the range of about 8.0 to 9.0 (i.e., slightly alkaline). [Although the test may be made at other stages, it is best at the stage just prior to the addition of the thickener and binding agent, for the purposes described hereafter.]

If the pH of the batch as it has been tested is too acid—i.e., a pH below 8.0 and especially below 7.0—a buffer such as ammonium hydroxide or sodium hydroxide may be added to the batch to make it more alkaline. On the other hand, if the pH of the batch is too alkaline—above 9.0—an acidifier such as muriatic acid or hydrochloric acid may be added to the batch to reduce the pH to the desired range. The effectiveness of the thickener and binding agent is affected by the pH of the water with which it is premixed, and by the pH of the batch into which it is mixed. For the thickener and binding agent to be most effective, the pH should be in the desired range of 8.0 to 9.0.

When a batch of tire sealant composition according to the present invention is manufactured, the batch process is carried out using a continuous mixing action vat or drum, and the manufacturing steps are carried out in the following order:

(a) water and ethylene glycol in more or less equal quantities are mixed together into the mixing vat or drum;

(b) the continuous mixing action of the vat or drum is started;

(c) sodium bicarbonate is added to the continuously mixing mixture;

(d) asbestos fiber is added to the continuously mixing mixture;

(e) hydrocarbon process oil is added to the continuously mixing mixture;

(f) detergent as a wetting agent and emulsifier (as discussed above) is added to the continuously mixing mixture;

(g) the pH of the continuously mixing mixture is tested and adjusted to about 8.0 or 9.0, if necessary, by the addition of suitable buffers or acidifers, as discussed above;

(h) the thickener and binding agent is pre-mixed with water;

(i) the pre-mix of step (h) is added to the continuously mixing mixture in the vat or drum;

(j) the mixing action of the vat or drum is continued until the composition of the batch being processed is thoroughly mixed.

In general, the elapsed time from the beginning of step (d) to the end of step (j) may be from one hour to five hours, depending on the size of the batch and other conditions such as the temperatures of the constituents as they were added, how well the asbestos fibers are dispersed into the mixture, the action of the detergent as a wetting agent and emulsifier to keep the oil in suspension in the water, and other factors.

The viscosity of the prior sealant composition may vary slightly from batch to batch, or it may be varied slightly from batch to batch depending on the purpose to which the tire sealant composition of that particular batch is to be put. For example, batches that have slightly lower viscosity are generally intended for injection into automobile tires; whereas batches that have slightly higher viscosity are intended for injection into truck tires; and batches that have still higher viscosity are generally intended for injection into the tires of off-road vehicles such as earth movers and the like. Thus, before or during step (j) above, the viscosity of the composition may be tested and adjusted so as to make the viscosity either higher or lower, if desired. To make the viscosity slightly lower, additional water is added to the batch; and to make the viscosity slightly higher, additional pre-mix thickener and binding agent together with water, is added to the batch.

The viscosity testing of the product as it is being mixed in each batch may be easily carried out using a rather unsophisticated method, and with consistency of viscosity from batch to batch. The test is simply that a one liter funnel having an exit spout of about 10 cm length and a 1.5 cm opening at the end of the spout is filled with 20 ounces of product, and the length of time for the product to completely discharge from the funnel is measured. That length of time may be from about 11 to 25 seconds for product according to any one of the three purposes to which it may be put.

The tire sealant composition of the present invention is normally injected in to tires that have already been mounted on to their rim and inflated to the manufacturer's recommended tire pressure. Four ounces of the tire sealant composition may be injected into a 13 inch automobile tire, 6 ounces into a 14 inch automobile tire, and 8 ounces into a 15 inch automobile tire. On the other hand, highway truck tires having a size 9.5–16.5 may require 24 ounces of tire sealant composition; those having a size 10.00–20 may require 48 ounces; and those having a size 11.00–24 may required 56 ounces of composition. Off-road tires having a size 11.2–38 may require 144 ounces; those having a size 14.00–24 may require 200 ounces of composition; and tires of the size 26.5–25 may require 416 ounces of tire sealant composition. The tire sealant composition is injected into the inflated and mounted pneumatic tire by removing the valve core and injecting the composition through the valve stem.

The following observations were made in some independent testing of compositions according to the present invention, particularly in use in automobile tires:

When the product was first injected into tires that had previously been mounted and inflated to the manufacturer's recommendations, and were placed on a computer wheel balancing machine, the tires could not be balanced. However, after spinning the tires for a period of time—such as by driving the car on which the tires were mounted for a distance of 15 kil.—the tires became balanced due to the centrifuged force against the composition within the tire, and when they were placed on a balancing machine after having been driven for 15 kil., they were found to be balanced. The explanation for that phenomenon is that because a tire which is on an automobile has a slightly lower radius and slightly greater width at the bottom than at the top, and as the tire rolls, the composition will be thrown by centrifugal force and will spread due to its own inertia around the tread area of the inflated tire. If the tire has a spot that is light—that is, there is a lower concentration of the material—or heavy—with a higher concentration of th material—the centrifugal forces acting against the semi-liquid composition in the tire will compensate against those light or heavy spots on the tire and thereby balance the tire.

The tire sealant composition is injected into the inflated and mounted pneumatic tire by removing the valve core and injecting the composition through the valve stem.

Other tests were carried on using identical tires, one of which had the sealant composition of the present invention injected into it, and the other of which did not, mounted on the front wheels of an automobile. In an ambient temperature of 26 degrees celsius, the automobile was driven for 45 miles, and the following results were observed:

The tire which did not have any prior sealant composition injected into it had a pressure before being driven of 35 psi and a wall temperature of 30 degrees celsius; after being driven its pressure had risen to 36 psi but the wall temperature had risen to 36 degrees celsius. The tire which had sealant composition injected into it had an initial pressure of 34 psi which rose to 35 psi; and the wall temperature rose from 30 degrees celsius to 32 degrees celsius. In other words, the tire that had the tire sealant composition of the present invention injected into it showed a temperature rise of only 33% against the other tire.

A number of puncture tests were carried out, where a tire was driven over such as a 4 inch nail having a 0.25 inch diameter, or a 2.5 inch finishing nail, and all tires that were so tested had the puncture seal immediately and were driven thereafter with no loss of pressure. The length of the test that was carried out on a number of the tires was 33 days, and no loss of pressure from any of the tires was detected.

Other tests, were carried out, and showed that the tire sealant composition had no corrosive effects on any metal that might be used as a wheel rim, that the composition had consistency of viscosity over temperature cycling from minus 40 degrees C to 23 degrees C without separation of the constituents, that the product did not cause balling or pilling with talc which is found on the inner casing of tires, and that the composition did not react with liquid water which may sometime be found inside a tire.

A tire sealant composition has been described, whose composition may be altered or varied, and whose constituents may in some cases be substituted by other similarly acting constituents, without depending from the spirit and scope of the appended claims.

I claim:

1. A tire sealant composition for injection into pneumatic tires, comprising:
    about 1 oz. (by weight) of sodium polyacrylate;
    about 37 oz. (by weight) of asbestos fibers;
    about 300 oz. (by weight) of ethylene glycol;
    about 8 oz. (by weight) hydrocarbon process oil;
    about 5 oz. (by weight) of detergent as a wetting agent and emulsifier;
    about 27 oz. (by weight) of sodium bicarbonate; and
    together with sufficient water to yield about 4.5 gallons (imperial measure) of final product.
2. The tire sealant composition of claim 1 where:
    the asbestos fibers have a length of from 0.5 to 1.5 cm;
    the hydrocarbon oil has an SAE rating of from 5W40 to 10W30; and the detergent is sodium dioctyl sulfosuccinate.
3. The tire sealant composition of claim 2, where the constituents are present in the following proportions:
    1 oz. (by weight) of sodium polyacrylate
    37 oz. (by weight) of asbestos fibers,
    300 oz. (by weight) of ethylene glycol,
    8 oz. (by weight) of hydrocarbon process oil,
    5 oz. (by weight) of detergent,
    27 oz. (by weight) of sodium bicarbonate,
    together with sufficient water to yield 4.25 gallons (Imperial measure) of final product.
4. The tire sealant composition of claim 1, where any of the constituents may be present in the stated amount plus or minus 10%.
5. The tire sealant composition of claim 4, having a pH in the range of 8.0 to 9.0.
6. The tire sealant composition of claim 4, further comprising any of ammonium hydroxide, sodium hydroxide, muriatic acid and hydrochloric acid, added as necessary to adjust th pH of the finished composition to about 8.0 to 9.0.
7. The tire sealant composition of claim 4, having a specific gravity in the range of 1.1 to 1.4.
8. A process for manufacturing a tire sealant composition to be injected into pneumatic tires, comprising the steps of;
    (a) mixing water and ethylene glycol together in a mixing vat or drum;
    (b) starting the continuous mixing action of the vat or drum;
    (c) adding sodium bicarbonate to the continuously mixing mixture;
    (d) adding asbestos fiber to the continuously mixing mixture;
    (e) adding hydrocarbon process oil to the continuously mixing mixture;
    (f) adding detergent to the continuously mixing mixture;
    (g) testing the pH of the continuously mixing mixture and adjusting the pH to about 8.0 or 9.0 by the addition of suitable buffers or acidifiers, as necessary;
    (h) pre-mixing the thickener and binding agent sodium polyacrylate with water;
    (i) adding the pre-mix of step (h) to the continuously mixing mixture; and
    (j) continuing the mixing action of the vat or drum until the composition is thoroughly mixed.
9. The process of claim 8, comprising the following further step before or during step (j);
    (k) testing the viscosity of the composition and adjusting the viscosity to a lower viscosity, if necessary or if desired for the batch of product being mixed, by adding more water to bring the viscosity to that which is desire for the particular batch which is being mixed.
10. The process of claim 8, comprising the following further step before or during step (j):
    (1) testing the viscosity of the composition and adjusting the viscosity to a higher, if necessary or if desired for the batch of product being mixed, by adding more thickener and binding agent which has been pre-mixed with water, so as to bring the viscosity to that which is desired for the particular batch which is being mixed.

* * * * *